US006048604A

United States Patent [19]

Brault et al.

[11] Patent Number: 6,048,604

[45] Date of Patent: Apr. 11, 2000

[54] DIRECT WRITE ELECTROGRAPHIC WALLCOVERING

[75] Inventors: Donald A. Brault, Ganby; Theresa M. Chagnon, Chicopee; Douglas A. Cahill, Belchertown; Angel Saavedra, Chicopee, all of Mass.

[73] Assignee: Rexam Graphics, Inc., South Hadley, Mass.

[21] Appl. No.: 09/087,182

[22] Filed: May 29, 1998

[51] Int. Cl.[7] ........................................ B23B 3/00

[52] U.S. Cl. ........................ 428/199; 428/195; 428/41.4; 428/41.8; 428/137; 428/354

[58] Field of Search ........................ 428/195, 354, 428/199, 41.4, 41.8, 137; 206/397

[56] References Cited

U.S. PATENT DOCUMENTS

| | | |
|---|---|---|
| 3,486,932 | 12/1969 | Schaper . |
| 4,322,331 | 3/1982 | Shay . |
| 4,420,541 | 12/1983 | Shay . |
| 4,524,087 | 6/1985 | Engel . |
| 4,569,584 | 2/1986 | St. Johns et al. . |
| 4,830,939 | 5/1989 | Lee et al. . |
| 5,124,730 | 6/1992 | Lewicki, Jr. et al. . |
| 5,126,769 | 6/1992 | Lewicki, Jr. et al. . |
| 5,171,627 | 12/1992 | Brockington et al. . |
| 5,187,501 | 2/1993 | Lewicki, Jr. et al. . |
| 5,192,613 | 3/1993 | Work, III et al. . |
| 5,262,259 | 11/1993 | Chou et al. . |
| 5,363,179 | 11/1994 | Cahill et al. . |
| 5,385,771 | 1/1995 | Willetts et al. . |
| 5,414,502 | 5/1995 | Cahill et al. . |
| 5,475,480 | 12/1995 | Cahill et al. . |
| 5,483,321 | 1/1996 | Cahill et al. . |
| 5,639,539 | 6/1997 | DeProspero et al. . |
| 5,869,179 | 2/1999 | Cahill et al. .......................... 4278/354 |
| 5,884,763 | 3/1999 | Ozawa .................................. 206/397 |

OTHER PUBLICATIONS

Chemical Fabrics & Film Assoc., Inc. CFFA Quality Standard For Vinyl Coated Fabric Wallcovering (1995).

Federal Specification Wall Covering Vinyl–Coated FSC5640 (Jan. 14, 1994).

*Primary Examiner*—William Krynski
*Assistant Examiner*—Hong J. Xu
*Attorney, Agent, or Firm*—Ratner & Prestia

[57] ABSTRACT

Electrographic recording elements suitable use as wallcoverings as disclosed. The element contains, in order: (a) a backside conductive layer; (b) a base; (c) a frontside conductive layer; and (d) a dielectric layer. The element has a wet shrinkage of less than about 2% in the machine direction and less than about 2%, preferably less than about 1%, in the cross-machine direction. In one embodiment the frontside conductive layer is a radiation cured conductive layer. In another embodiment the backside conductive layer is adhesive. In another embodiment the element additionally comprises a filled layer between the base and the frontside conductive layer.

37 Claims, 1 Drawing Sheet

DIRECT WRITE ELECTROGRAPHIC WALLCOVERING

FIELD OF THE INVENTION

This invention relates to wallcoverings. More particularly, this invention relates to electrographic recording elements suitable use as wallcoverings.

BACKGROUND OF THE INVENTION

Wallcoverings, typically referred to as wallpapers, decorate and protect the underlying wall surface. Such wallcoverings typically comprise a base sheet, on which an image or pattern may be printed or embossed, adhered to the wall with an adhesive. Water-based adhesives, such as wallpaper pastes, and pressure sensitive adhesives, such as those described in DeProspero, U.S. Pat. No. 5,639,539, may be used.

Wallcoverings are typically mass produced. Because only a limited number of colors and patterns can be economically mass produced, customers have a limited selection of wallcoverings from which to choose. A particular color and pattern is typically only produced for a limited period of time, so it may be difficult or impossible for a customer to obtain more wallcovering of a particular color and pattern at a later date. In addition, retailers must stock a large number of patterns. This produces high inventory carrying costs as well as losses due to inventory that is never sold. It has been estimated that 30 to 40% of all printed wallpaper is never used.

Because current production and distribution methods are most efficient when a large amount a particular color and pattern is produced, custom-designed wallcoverings tend to be expensive. In addition, the customer may be required to purchase considerably more wallcovering than is desired.

Digital imaging, particularly electrographic imaging, can potentially economically produce small amounts of custom-designed wallcoverings on demand because small amount of material can be printed economically with short turnaround times. Retailers would be able to provide customers with a much wider choice of colors and patterns. Customers could even request their own designs. With digital storage of the image, customers would be able to get an exact match of both color and pattern when reordering, even years later. Storage costs and inventory losses also would be greatly reduced. Because only the desired amount of wallcovering would be produced, it would be unnecessary for the retailer, or the customer, to store large amounts of printed wallcovering.

In electrographic imaging a latent image of electric charge is formed on a surface of an electrographic recording element, which typically comprises a dielectric layer, a conductive layer, and a base or support. The latent image is produced by imagewise deposition of electrical charge onto the surface of the dielectric layer. Typically, charged styli, arranged in linear arrays across the width of a moving dielectric surface, are used to create the latent image. Toner particles that are attracted to the charge are applied to the surface of the dielectric layer to render the latent image visible. The toned image is fixed, typically by fusing the toner particles to the element. Such processes are disclosed, for example, in Helmberger, U.S. Pat. No. 4,007,489; Doggett, U.S. Pat. No. 4,731,542; and St. John, U.S. Pat. No. 4,569,584.

A material suitable for use as a wallcovering should satisfy the standards given in "Standard Classification of Wallcovering by Durability Characteristics," ASTM Test Method F-793-93, incorporated herein by reference. In particular, the material should possess scrubability, washability, and stain and tear resistance. In addition, it should have a wet shrinkage of about 2% or less, preferably less than about 2% in the machine direction and less than about 1% in the cross-machine direction.

Willetts, U.S. Pat. No. 5,385,771, discloses an electrographic recording element suitable for the printing quality images and which can be used in pastable displays, such as billboards and wallpaper. However, it is necessary to apply paste to the backside of the element after imaging, making it inconvenient to apply the imaged element to a surface.

SUMMARY OF THE INVENTION

The invention is an electrographic recording element suitable for forming a wallcovering. The element comprises, in order:

(A) a backside conductive layer;

(B) a base;

(C) a frontside conductive layer; and (D) a dielectric layer;

wherein:

the surface resistivity of the frontside conductive layer is about $1\times10^5$ Ω/□ to about $1\times10^8$ Ω/□;

the surface resistivity of the backside conductive layer is about $1\times10^5$ Ω/□ to about $1\times10^8$ Ω/□; and the element has a wet shrinkage about 2% or less in the machine direction and about 2% or less in the cross-machine direction.

In a preferred embodiment, the element has a wet shrinkage of less than about 2% in the machine direction and less than about 1% in the cross-machine direction. In one embodiment the frontside conductive layer is a radiation cured conductive layer. In another embodiment the backside conductive layer is adhesive. In another embodiment the element additionally comprises a filled layer between the base and the frontside conductive layer.

The elements of the invention satisfy the ASTM wet shrinkage requirements for Category IV wallcoverings. Wet shrinkage measures how much an element changes from its original size when it is soaked in water and dried. To satisfy the this requirement, the imaged element must have a wet shrinkage of about 2% or less in the machine direction and about 1% or less in the cross-machine direction. Even more preferable the element has a wet shrinkage of about 1% or less in the machine direction and about 0.5% or less in the cross-machine direction.

For billboard applications, such as those disclosed by Willetts, wet expansion, the change in size when the element is soaked in water, is important because the panels are typically overlapped when they attached to a substrate. However, panels of wallcovering are typically butted against each other, rather than overlapped, when attached to a substrate, so wet shrinkage, rather than wet expansion is important for wallcovering.

DETAILED DESCRIPTION OF THE INVENTION

Figure 1:
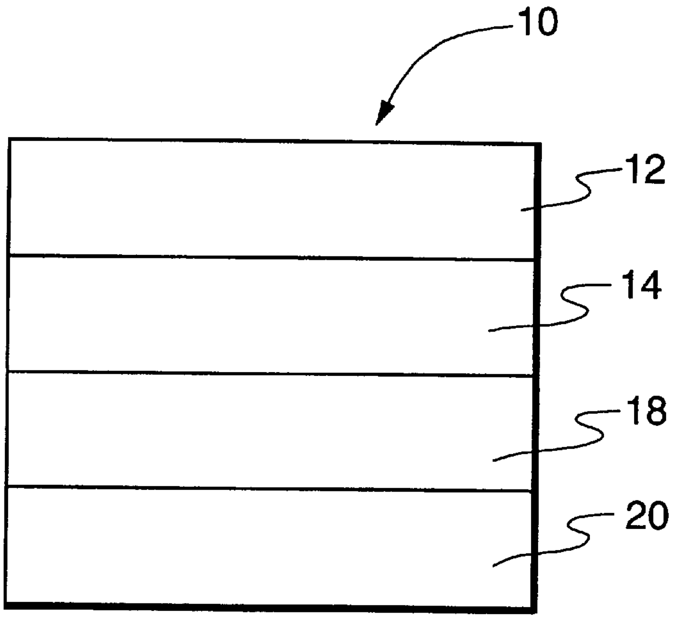
FIG. 1 is a schematic representation of an embodiment of an electrographic recording element of this invention.
Figure 2:
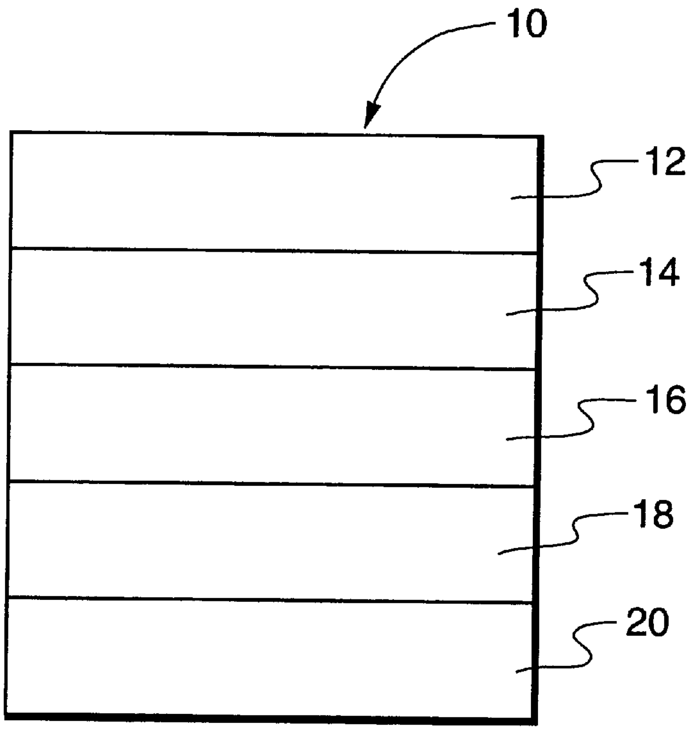
FIG. 2 is a schematic representation an alternate embodiment of an electrographic recording element of this invention in which the element additionally comprises a filled layer.

The invention is electrographic recording element suitable for forming a wallcovering. Referring to FIG. 1, in one embodiment electrographic recording element 10 comprises dielectric layer 12, frontside conductive layer 14, base 18, and backside conductive layer 20. Referring to FIG. 2, in another embodiment element 10 comprises dielectric layer 12, frontside conductive layer 14, filled layer 16, base 18, and backside conductive layer 20.

BASE

Base 18 functions as a support for the other layers of the element and should possess the surface and physical properties for its intended use, such as tensile and tear strength, stiffness, etc., and which allow the element to satisfy the ASTM requirements for Category IV wallcoverings. It may be any web or sheet material possessing suitable flexibility and dimensional stability for use in wallcovering and that possesses suitable adherence properties to conductive layer 14, or filled layer 16, and backside conductive layer 20. Such bases include sheets or webs of woven and nonwoven fabrics of natural and synthetic fibers such as cotton; fibrous products such as paper and wood; single and multi-ply, continuous film products; and composites thereof. The base may be impregnated or sub-coated with a resinous or polymeric material to bond component fibers, to seal pores, or to otherwise improve its bulk and surface properties.

Typically base 18 is a porous material, such as paper, fabric, or a non-woven material, such as Tyvek® spun-bonded polyolefin sheet. Due to its relatively low cost, paper is preferred as the base for the manufacture mass-produced, residential, quality electrographic wallcoverings. Paper may be calendered to enhance its smoothness. Either conductive or non-conductive papers can be used. The weight of the paper may vary over a wide range, for example 40–170 g/m$^2$. The paper should possess the required surfaces properties to be used with conventional wallpaper adhesives. Suitable materials include paper impregnated with a saturant having a Tg of 5° C. to −50° C., and paper containing polyamide epichlorohydrin wet strength resin, such as is used in the electrographic elements disclosed by Willetts, U.S. Pat. No. 5,385,771, incorporated herein by reference.

Impregnated or sub-coated paper having a thickness from about 0.005 inch to about 0.030 inch (0.13–0.76 mm) can be used, especially for elements that comprise a filled layer. A paper sheet comprising 20 to 95 parts of short fibers and 80 to 5 parts of long fibers, preferably 70 to 95 parts of short fibers and 30 to 5 parts of long fibers, is especially suited for these elements. Generally softwood fibers are longer than hardwood fibers. Hardwood fibers have a fiber length of from 1.4 mm to 1.9 mm with a concomitant diameter of from 14 to 40 microns. Softwood fibers have a fiber length of from 3.0 mm to 4.9 mm with a concomitant diameter of from 35 to 45 microns. The ratio of hardwood to softwood fibers is selected to provide a base exhibiting high adsorbancy for a saturating material and high uniformity.

The paper sheet can be saturated with a saturant having a Tg of 5° C. to −50° C., especially for elements that comprise a filled layer. The saturant comprises 5% to 50% on a dry weight basis of the resulting sheet. The saturant is selected to provide the substrate with the proper strength and flexibility. Typical saturants include emulsions of acrylics, vinyl acrylic copolymers, acrylonitrile acrylic copolymers, ethylene vinyl acetates, and various rubber emulsions. Methylol acrylamide and other monomers that provide curing sites are often included in the polymer backbone of the saturant to cross-link the polymer during drying. Typical saturants include: Hycar® 26092, Hycar® 26083, Hycar® 26322, Hycar® 26345, Hycar® 26796, and Hycar® V-43. Paper sheets suitable for use as bases are disclosed by Brockington, U.S. Pat. No. 5,171,627, incorporated herein by reference.

FRONTSIDE CONDUCTIVE LAYER

Frontside conductive layer 14 must: (1) have electrical properties required for the electrographic element, typically a surface resistivity of $10^5$–$10^8$ Ω/□, preferably $10^6$–$10^7$ Ω/□; (2) have a smooth surface so that a uniform, continuous, and flaw-free dielectric layer is produced when the dielectric layer is coated on top of the frontside conductive layer; and (3) prevent the dielectric material from penetrating the base when the dielectric layer is coated on top of the frontside conductive layer.

Any of the conductive compositions known in the art may used to form frontside conductive layer 14. The layer may comprises a film-forming organic material, such as: cation-type styrene-methacrylate copolymers having an electrical resistivity of about 1–30×$10^6$ Ω/□; polymeric quaternary ammonium compounds, such as are described in Schaper, U.S. Pat. No. 3,486,932; polymerized quaternary ammonium salts, such as are described in Shay, U.S. Pat. Nos. 4,322,331, and 4,420,541; salts of polystyrene sulfonic acid, such as sodium polystyrene sulfonate; and polymeric matrices capable of ionizing inorganic electrolytes contained therein. The film-forming, organic material may be used alone or with conductive, inorganic materials and/or metals, such as tin oxide and aluminum, dispersed therein.

Frontside conductive layer 14 may comprise a conductive particulate material, such as synthetic hectorite clay, bentonite, carbon black, graphite, aluminum, tin oxide, zinc oxide, antimony oxide, and antimony/tin oxide deposited on silica particles, dispersed in a polymeric binder. Conductive compositions comprising conductive particulate materials are disclosed, for example, in Willetts, U.S. Pat. No. 5,385,771, and Work, U.S. Pat. No. 5,192,613, both of which are incorporated herein by reference. However, elements in which the frontside conductive layer comprises a conductive particulate material may not be useful for all applications because the conductive particulate material may impart an undesired color to the element.

RADIATION CURED CONDUCTIVE LAYERS

In one embodiment of the invention, frontside conductive layer 14 comprises a radiation cured conductive composition. Radiation curable conductive compositions and their method of use are disclosed, for example, in Taylor, Ser. No. 08/768,967, U.S. Pat. No. 5,759,636, incorporated herein by reference. When a radiation curable composition is used to form the frontside conductive layer, after curing the frontside conductive layer has a surface resistivity of $10^5$–$10^8$ Ω/□, preferably $10^6$–$10^7$ Ω/□.

Radiation curable conductive compositions typically comprise an ethylenically unsaturated ammonium salt, which contains a quaternary ammonium cation and an inorganic or organic anion. Typical reactive ammonium precursors are: (3-(methacryloylamino)propyl) trimethylammonium chloride (MAPTAC), dimethylaminoethyl methacrylate dimethylsulfate quaternary (Ageflex® FM1Q80DMS), dimethylaminoethyl acrylate methylchloride quaternary (Ageflex® FA1Q80MC), dimethylaminoethyl methacrylate methylchloride quaternary (Ageflex® FM1Q75MC), dimethylaminoethyl acrylate dimethylsulfate quaternary (Ageflex® FA1Q80DMS), diethylaminoethyl acrylate dimethylsulfate quaternary (Ageflex® FA2Q80DMS), dimethyldi-allylammonium chloride (Ageflex® DMDAC), and vinylbenzyltrimethylammonium chloride, all of which are water soluble and, typically supplied with up to 50 wt % water.

The composition may comprise one or more other polymerizable precursors which function as free radical cross-linking agents to accelerate growth of the polymer during polymerization. Typical multifunctional polymerizable precursor are multifunctional monomeric material, such as trimethylolpropane triacrylate, pentaerythritol triacrylate, pentaerythritol tetraacrylate, pentaerythritol tetramethacrylate, ethoxylated-trimethylolpropane triacrylate, glycerolpropoxy triacrylate, ethyleneglycol diacrylate, tripropyleneglycol diacrylate, and tetraethyleneglycol diacrylate, and ethoxylated precursors such as ethoxylated-trimethylolpropane triacrylate (TMPEOTA), and an oligomeric materials, such as acrylated urethanes, polyesters, and polyepoxides; and acrylics.

Monofunctional precursors may also be present to adjust the properties of the polymer, e.g., flexibility and glass transition temperature, as well as act a polymerizable co-solvent for the components of the liquid polymerizable mixture used to form the polymeric material. Useful monofunctional precursors include, for example, N-vinyl pyrrolidone, tetra-hydrofurfuryl acrylate (SR 285), tetrahydrofurfuryl methacrylate (SR 203), and 2-(2-ethoxyethoxy) ethyl acrylate (SR 256).

The radiation curable composition may also comprise a conductivity enhancing comonomer. The conductivity enhancing comonomers are selected from the group consisting of (1) interpolymerizable acids with an acid number between 100 and 900, (2) hydroxyalkyl esters of acrylic or methacrylic acid, and (3) cyanoalkyl esters of acrylic or methacrylic acid. To provide the desired resistivity, either a single comonomer or a mixture of comonomers may be present. Conductivity enhancing comonomers are disclosed in Bennett, U.S. Pat. No. 5,883,212, incorporated herein by reference.

Typical interpolymerizable acids include acrylic acid, methacrylic acid, β-carboxyethyl acrylate, itaconic acid, 2-(acryloyloxy)ethyl maleate, 2-(methacryloyloxy)ethyl maleate, 2-(acryloyloxy)propyl maleate, 2-(methacryloyloxy)propyl maleate, 2-(acryloyloxy)ethyl succinate, 2-(methacryloyloxy)-ethyl succinate, 2-(acryloyloxy)-ethyl o-phthalate, 2-(methacryloyloxy) ethyl o-phthalate, 1-carboxy-2-[2-acryloxyloxyethylcarboxylate]cyclohex-4-ene, 1-carboxy-2-[2-methacryloxyloxyethylcarboxylate]cyclohex-4-ene; and carboxylated additives having acid numbers of 100 to 900, such as Ebecryl® 169 and Ebecryl® 170. As is well known to those skilled in the art, acid number is defined as the number of mg of potassium hydroxide required to neutralize 1 g of the interpolymerizable acid. Preferred interpolymerizable acids are the low molecular weight acidic acrylic precursors, β-carboxyethyl acrylate and 2-(acryloyloxy)-ethyl maleate.

Typical hydroxyalkyl esters of acrylic or methacrylic acid include 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate.

Typical cyanoalkyl esters of acrylic or methacrylic acid include 2-cyanoethyl acrylate and 2-cyanoethyl methacrylate.

The material may comprise a photoinitiators to facilitate copolymerization of the polymerizable precursors. When the material is to be cured by irradiation with ultra-violet radiation, a free radical generating, initiating system activatable by ultra-violet radiation is typically present. Suitable photoinitiating systems have been described in "Photoinitiators for Free-Radical- Initiated Photoimaging Systems," by B. M. Monroe and G. C. Weed, Chem. Rev., 93, 435–448 (1993), and in "Free Radical Polymerization" by K. K. Dietliker, in Chemistry and Technology of UV and EB Formulation for Coatings, Inks, and Paints, P. K. T. Oldring, ed, SITA Technology Ltd., London, 1991, Vol. 3, pp. 59–525.

Photoinitiators that do not impart a color to the frontside conductive layer are preferred. Preferred free radical photoinitiating compounds include benzophenone; 2-hydroxy-2-methyl-1-phenylpropan-1-one (Darocur® 1173); 2,4,6-trimethylbenzolyl-diphenylphosphine oxide (Lucerin® TPO); 2,2-dimethoxy-2-phenyl-acetophenone (benzildimethyl ketal, BDK, Irgacure® 651, Lucerin® BDK); 2-methyl-1-[4-(methylthio)-phenyl]-2-morpholinopropanone-1 (Irgacure® 907); 1-hydroxycyclohexylphenyl ketone (HCPK, Irgacure® 184); bis(2,6-dimethoxybenzolyl)-2,4,4-trimethylpentylphosphine oxide; and combinations thereof. Mixed photoinitiators include a 50:50 blend of 2-hydroxy-2-methyl-1-phenylpropan-1-one and 2,4,6-trimethylbenzolyl-diphenylphosphine oxide (Darocur® 4265); and a 25:75 blend of bis(2,6-dimethoxybenzolyl)-2,4,4-trimethylpentylphosphine oxide and 2-hydroxy-2-methyl-1-phenylpropan-1-one (CGI 1700).

The radiation curable layer comprises 10 to 90 parts by weight of one or more ethylenically unsaturated ammonium precursors and 10 to 90 parts by weight of one or more other polymerizable precursors, based on the total weight of these components present in the conductive coating composition, and excluding the weight of the photoinitiator system and the weight of any other materials present in the conductive coating composition.

In the absence of a conductivity exalting monomer, higher levels of ethylenically unsaturated ammonium precursors are preferred. In this instance, the conductive coating composition comprises preferably 50 to 90 parts by weight ethylenically unsaturated ammonium precursors and more preferably 70 to 90 parts by weight ethylenically unsaturated ammonium precursors. When a photoinitiator is present, the ethylenically unsaturated ammonium precursors and other polymerizable precursors together comprise at least 80 percent by weight, and preferably at least 90 percent by weight, of the total solids in the frontside conductive layer. When neither a photoinitiator nor a pigment is present, the ethylenically unsaturated ammonium precursors and other polymerizable precursors together comprise at least 90 percent by weight, and preferably about 100 percent by weight, of the total solids present in the frontside conductive layer.

When a conductivity exalting monomer is used, a lower level of ethylenically unsaturated ammonium precursors can be used. In this instance, conductivity exalting comonomers and ethylenically unsaturated ammonium precursors together comprise 40 to 100 parts by weight, preferably 45 to 90 parts by weight, of the total weight of the ethylenically unsaturated ammonium precursor and other polymerizable precursors present in the conductive coating composition. The ratio of the conductivity exalting comonomer or comonomers to ethylenically unsaturated ammonium precursor or precursors is in the range of 0.25 to 2.0. This means that the comonomer is between about 20 parts by weight to 67 parts by weight of the total of comonomer and ammonium precursor or precursors, and the ethylenically unsaturated ammonium precursor or precursors are between 33 parts by weight and 80 parts by weight of the total of comonomer and ammonium precursor or precursors. Preferably, the ratio is in the range of 0.33 to 1.5. This means that, preferably, the comonomer is between about 25 parts by weight to 60 parts by weight of the total of comonomer and ammonium precursor or precursors, and the ethylenically unsaturated ammonium precursor or precursors are between 40 parts by weight and 75 parts by weight of the total of comonomer and ammonium precursor or precursors.

Other polymerizable precursors exclusive of the conductivity exalting comonomers make up the rest of the polymerizable materials present in the conductive coating composition. Typically, most or all of the remaining other polymerizable precursors are multifunctional polymerizable precursors. These precursors are typically greater that 55 parts by weight, and preferably greater than 85 parts by weight, of the other polymerizable precursors exclusive of the conductivity exalting comonomer.

When the conductive coating composition is to be cured by irradiation with ultraviolet radiation, it typically contains about 1 to 10 parts by weight, more typically about 3 to 8 parts by weight, of a photoinitiator, based on the total solids in the composition. When the conductive coating composition is to be cured by irradiation with an electron beam, a photoinitiator is not required. When one or more pigments are present, they typically comprise up to 6 to 8 parts by weight of the total solids in the composition.

A radiation cured conductive layer produced on a porous base typically has Sheffield surface roughness that is less than the surface roughness of the porous base by at least a factor of one third. Typically, Sheffield surface roughness values of less than about 70, more typically less than 40, are observed for conductive layers produced on porous bases. Values of 30 to 15, and even 20 or less, are often observed.

Solvent holdout for the intermediate element formed by coating the conductive coating composition onto a porous base and curing it, measured on the coated side of the intermediate element, i.e., the side containing the conductive layer, is typically increased by at least factor of five and is frequently increased by a factor of at least 50 to 100. Solvent holdout for the intermediate element, measured on the coated side, is typically greater than 10 seconds, and is frequently greater 100 sec.

The frontside conductive layer must have good solvent holdout to prevent the dielectric material from penetrating the base when the dielectric layer is coated on top of the frontside conductive layer. Because the radiation cured frontside conductive layer is both smooth and resists penetration by solvent during coating of the dielectric layer, the images have higher image density, reduced background, reduced grain, reduced mottle, reduced overtoning, and greater small-scale uniformity than comparable images formed on electrographic recording elements produced by other methods.

Because the radiation cured frontside conductive layer is more uniform, the operating voltage of the printer can be increased without causing dielectric breakdown. This provides more latitude to adjust color. The electrographic recording elements can be processed at higher speeds by printers using high solids liquid toners, increasing the productivity of the printer and reducing the time required to form an image. Background is caused by excess toner that is not removed by the printer. This need to remove excess toner limits the speed at which the printer can operate. Because smoothness prevents excess toner from being picked up in non-image areas during toning, electrographic imaging elements produced by this method have inherently lower background. Thus, higher solids toners can be used so that the printer can operate at higher speed without producing an unacceptably high background.

It will be appreciated that the radiation cured frontside conductive layer is generally useful for electrographic recording element suitable for forming wallcoverings. Its application is not limited to those comprising an adhesive backside conductive layer and/or to those comprising a filled layer.

DIELECTRIC LAYER

Dielectric layer 12 determines the electrostatic charge accepted by the element and the time during which it will hold the charge. In addition, it must have sufficient dielectric strength to support the charging current without breakdown. The property requirements of the dielectric layer are well known in the art as disclosed, for example, in Akiyama, U.S. Pat. No. 3,920,880, and Coney, U.S. Pat. No. 4,201,701.

Dielectric layer 12 may be any conventional film-forming material having a dielectric constant of about 2 to about 5. Typically, a highly resistive polymer is used, such as homopolymers and copolymers of the following monomers: vinyl acetate; vinyl chloride; vinylidene chloride; vinyl butyral; acrylate monomers, such as methyl acrylate and ethyl acrylate; methacrylate monomers, such as methyl methacrylate, ethyl methacrylate, and butyl methacrylate; acrylonitrile; ethylene; styrene; and butadiene. The layer typically has a thickness of about 1 $\mu$m to about 20 $\mu$m and preferably about 3 $\mu$m to about 10 $\mu$m.

The dielectric layer may contain a matte agent or pigment to provide the spacing and abrasion necessary for the imaging process. The pigment may also serve to increase opacity, improve texture, reduce gloss, and increase the dielectric constant of the dielectric layer. The pigment may be, for example, clay, titanium dioxide, calcium carbonate, or silica. A dispersant for the pigment may also be required. The pigment may comprise from 10 percent by weight to 75 percent by weight, preferably about 50 percent by weight, of the dielectric layer on a dry weight basis.

BACKSIDE CONDUCTIVE LAYER

The backside of base 18 (i.e., the side opposite that on which the conductive layer is coated) is coated with a conductive coating to form backside conductive layer 20. The compositions used to form the frontside conductive layer may also be used to form the backside conductive layer. Backside conductive layer 20 may comprise a film-forming organic material, such as described above, or a conductive particulate material, such as described above.

ADHESIVE BACKSIDE CONDUCTIVE LAYER

In one embodiment of the invention, backside conductive layer 20 is adhesive. A conductive adhesive, comprising a conductive quaternary ammonium resin and an adhesive that is compatible with the conductive quaternary ammonium resin, may be used to form the adhesive backside conductive layer. Conductive quaternary resins include materials such as Chemistat® 6300H resin, Agestat® 41T resin, Agestat® 1410 resin, and Makrovil® ECR69 resin. Adhesives compatible with conductive quaternary resin include: starch, i.e., Solvitose® HTC-1 adhesive; polyvinyl acetates, i.e., Vinac® ASB-516 resin; polyvinyl alcohols, i.e., Airvol® 540 resin; methyl cellulose, i.e., Methocel® E15-LV methyl cellulose; polyacryl amides, i.e., Cyanamer® P-21; and polyacrylates, i.e., Acrylsol® polymers.

The conductive adhesive should comprise sufficient conductive quaternary resin to produce a layer whose surface resistivity is about $10^5$–$10^8$ Ω/□, preferably $10^6$–$10^7$ Ω/□; and comprise sufficient adhesive to adhere the imaged electrographic recording element to a wall or other support when dried. Typically, the conductive adhesive contains more conductive quaternary resin than adhesive, based on the weight of the solids present in the conductive adhesive.

The adhesive backside conductive layer gives the electrographic recording element the properties of a pre-pasted wallcovering. It is unnecessary to apply an adhesive to the element after imaging. The imaged element can be adhered directly to a support. The support will typically be a flat, vertical surface, such as a wall. The element can also be applied to a flat horizontal surface, such as ceiling.

It will be appreciated that the adhesive backside conductive layer is generally useful for electrographic recording element suitable for forming wallcoverings. Its application is not limited to those comprising a radiation cured conductive layer and/or those comprising a filled layer.

FILLED LAYER

Referring to FIG. 2, in another embodiment of the invention element 10 comprises, in order, dielectric layer 12, frontside conductive layer 14, filled layer 16, base 18, and backside conductive layer 20. The filled layer imparts the high durability needed by a wallcovering to the element. It comprises a binder and a filler system. Minor amounts of other ingredients may be present for specific purposes.

The acrylic polymer typically has a glass transition temperature (Tg) between about −10° C. and about 10° C., preferably, between about −5° C. and about 5° C. In addition, the acrylic polymer should have good coatability properties when formulated to form the coating composition. If the binder has cross-linking ability when exposed to heat, solvent resistance, heat resistance, and toughness are imparted to the final product.

Although not limited to polymers of any particular composition, useful polymers will typically be polymers and copolymers of esters of acrylic and/or methacrylic acid with alcohols having 1 to 8 carbon atoms, more typically 1 to 4 carbon atoms, which may be co-polymerized with smaller amounts other monomers, such as vinyl acetate and acrylonitrile. A small amount of a monomer such as methylol acrylamide may be included so that polymer will cross-link when exposed to heat. Preparation of polymers of this type is well known to those skilled in the art. The acrylic polymer is conveniently handled as a polymer latex. Hycar® 2679, a heat-reactive acrylic polymer suggested as a saturant and/or backcoating for textile fabrics, nonwoven fabrics, and paper, can be used. This material is believed to be composed of ethyl acrylate copolymerized with acrylonitrile and methylol acrylamide.

The filler system comprises a pigment or combination of pigments chosen from the numerous pigments well known to those skilled in the art. Pigment means a finely divided particulate material, normally insoluble in the polymer phase. Typically, the pigment or mixture of pigments is chosen to provide a white background so that the filled layer will not impart a background color to the image. Pigments that may be used include: silica, or a silicate such as calcium silicate or sodium aluminum silicate; calcined clay; titanium dioxide; white filler pigments, such as hydrated clay; and pigmentary polymeric particulate or "plastic pigment," such as particles of a cross-linked organic polymer.

If silica is used, not all grades of silica have mix viscosities that will produce a favorable coating rheology. If the silica causes too great an increase in the viscosity of the coating composition, the coating process can be adversely affected. Some grades are prone to "dusting" during mix preparation, which causes cleanup problems as well as health hazards due to inhalation. Silicas that are surface coated to give hydrophobic properties are not favorable for dispersion in water. Silicas with a pH above 7.0 are preferred for use with cellulosic bases. Calcined silicas, especially those derived from microscopic organisms, are very hard, which causes unwanted abrasiveness. Generally, an average particle size under 10 microns is preferred. Various ratios of 1.0, 3.0, and 5.0 micron particles can be blended for particular performance and coating requirements. Useful silicas include Syloid® W-500 silica and Syloid® W-300 silica.

Various silicates may be used in place of, or in combination with, silica. Calcium silicate, such as Hubersorb® 600, and sodium aluminum silicate, such as Huberfill®, Hydrex®, and the Zeolex® series can be used. Also useful are silica sols, a colloidal form of silica in water, such as Ludox® and Nalco sols.

Calcined clay is moderate cost space filler that generates more void volume than hydrated clay and other inexpensive while filler pigments. A useful calcined clay is Ansilex® 93 calcined clay. The inexpensive white filler pigment aids opacity while minimizing cost. Typical inexpensive white filler pigments are hydrated clay, calcium carbonate, and barium sulfate. A useful hydrated clay is Hydro Gloss® 90 hydrated clay. Titanium dioxide can be used to provide the filled layer with the desired level of whiteness and opacity. Pigmentary polymeric particles add opacity to the coating. Examples of pigmentary polymeric particles include fine particles of cross-linked polystyrene, cross-linked polyvinyl chloride, and cross-linked acrylic polymers and co-polymers, such as cross-linked polymethyl methacrylate. A useful material is Ropaque® HP-91, a styrenated acrylic.

The filled layer may comprise additional components that are conventionally used to disperse pigments, to facilitate coating, and the like. Surface active agents, i.e., surfactants, soaps, etc., are used to disperse pigments within the coating composition as well as wetting agents during coating of the coating material on the substrate. Surface active agents and dispersing agents are well known to those skilled in the art. Other conventional processing additives include air entrainment control agents, compounds for pH and microbe control, and the like. Small amounts of conventional thickeners, such as methyl cellulose, hydroxypropyl methyl cellulose, and alginates and related thickening agents, can also be added to the coating composition without adversely affecting the properties of the filled layer.

The ratio of filler system (i.e., pigment or pigments) to binder is typically about 2.1 to 3.1, preferably about 2.4 to 2.8, based on the total weight of the pigment or pigments present in the filled layer to the total weight of the binder or binders present in the filled layer. The pigment or pigments and binder or binders together typically comprises at least 90% by weight, preferably greater than 95% by weight, of the filled layer. Suitable combinations of base 18 and filled layer 16 are described in Grinnell, U.S. Pat. No. 5,799,978, incorporated herein by reference. Suitable materials are available from Decorative Specialties International, Brownville, N.Y., as Hyflex® 7 papers.

It will be appreciated that a filled layer is generally useful for electrographic recording element suitable for forming wallcoverings. Its application is not limited to those comprising a radiation cured frontside conductive layer and/or to those comprising an adhesive backside conductive layer.

ELEMENT PREPARATION

Electrographic recording element 10 is manufactured using conventional coating equipment and processes. Typically, base 18 is in the form of a long web which is stored as a roll prior to coating. During coating, the web is unwound from the roll, passed through the coating station of the coater, and passed directly into a drying unit.

The coating composition used to form each layer consists of a solution and/or dispersion of the coating solids in a volatile solvent, such as an organic liquid or water. The coating composition can be coated by a variety of well-known manual and full-scale production techniques, such as: coating with wire wound or smooth (#0) Mayer rods; direct gravure or offset gravure, which are especially useful for depositing very low coating weight in the order of 0.2 to 5 g/m$^2$; and roll, slot, spray, dip and curtain coating and the like.

Following coating, the element is typically carried through a tunnel dryer in which the coated layer is dried under controlled conditions to develop the proper coating structure. The particular drying conditions used are dependent upon the coating solvent, the choice of equipment used, and production requirements.

Frontside conductive layer 14 is prepared by coating a coating composition onto base 18 or filled layer 16. The coating composition is coated as a solution or a dispersion. When the composition is coated as a dispersion, the coated dispersion typically is hazy. When a conductive coating composition is coated, the coated dispersion, upon curing, typically forms a transparent, continuous, defect-free layer.

For rod coating, the coating composition for a conventional conductive layer has a viscosity below 100 cps, typically about 50 cps. For a radiation curable conductive layer the composition typically has a viscosity of about 300 to 500 cps. As is well known, viscosity can be altered by the addition of appropriate volatile solvents, polymerizable precursors, pigments, and/or other additives required to match the needs of the coating process with the desired properties of the conductive layer, such as coating weight, penetration of the base, and coverage. At lower viscosities, greater penetration and less coverage is typically observed; at higher viscosities, higher coverage and less penetration is observed.

The preparation of radiation curable conductive coatings is disclosed in Cahill, U.S. Pat. No. 5,869,179; Bennett, U.S. Pat. No. 5,883,212; and Taylor, U.S. Pat. No. 5,759,636, all of which are incorporated herein by reference. If a radiation curable conductive coating composition is used, the one or more ethylenically unsaturated ammonium precursors and the other polymerizable precursors together comprise at least 50 percent by weight, preferably 70 percent by weight, of the total solids present in the radiation curable composition. The coating composition typically comprises at least 50 percent total solids, and preferably at least 70 percent total solids, more preferably at least 73 percent total solids. If it is not necessary to add a small amount of volatile solvent to control the surface tension and viscosity of the conductive coating composition, at least 80 percent total solids is preferred. As is well known to those skilled in the art, total solids refers to the total amount of non-volatile material in the conductive coating composition, even though some of these materials may be non-volatile liquids before cure.

Following coating of a radiation curable composition, frontside conductive layer 14 is cured either with ultra-violet or with electron beam radiation. Cure refers to polymerization and/or crosslinking of the ethylenically unsaturated precursors by free-radical initiated addition polymerization. Ultra-violet cure is accomplished by exposing a conductive coating containing a photoinitiator to intense ultra-violet light sources such as those available from AETEK International (Plainfield, Ill.) or Fusion U.V. Curing Systems, Inc. (Rockville, Md.). Exposure may be carried out either in sheet form, as in the AETEK laboratory units, or in continuous web form, as on production scale coating machines having an ultra-violet curing station following the coating head. Alternatively, the conductive coating can be cured by exposure to an electron beam. As is well known to those skilled in the art, the curing conditions depend upon a number of factors such as: the nature and amount of ethylenically unsaturated ammonium precursor present, the nature and amount of other polymerizable components present, the nature and amount of photoinitiator present, coating thickness, line speed, lamp or beam intensity, and the presence or absence of an inert atmosphere.

After conductive layer 14 has been dried and, if necessary, cured, it is overcoated with dielectric layer 12. It is extremely important that a smooth, continuous, uniform, flaw-free coating be obtained. Dielectric layer 12 is typically coated from a volatile aqueous or a non-aqueous solvent, and the solvent removed by heating after coating. Coating of a dielectric layer from an aqueous solvent is disclosed in, for example, Work, U.S. Pat. No. 5,192,613. Any of the commonly used coating techniques, such as those described above, may be used to coat dielectric layer 12.

Backside conductive layer 20 is conveniently coated either before or after frontside conductive layer 14 and dielectric layer 12 have been applied. For rod coating the viscosity of the coating composition should be less than 100 cps, typically about 40 to 50 cps. To produce this viscosity, the coating composition should be less than about 20.0% total solids. When an adhesive backside conductive layer 20 is being coated, the coating weight is typically about 1.0 to 1.5 lb/tsf (about 4.9 to 7.3 g/m$^2$).

Preparation of an element consisting of base 18 and filled layer 16 is described in Grinnell, U.S. Pat. No. 5,799,928, incorporated herein be reference. Preferably, the air knife technique is used to apply the coating composition for filled layer 16 to base 18. After drying, filled layer 16 typically is 15 to 30 microns thick, preferably 20 to 25 microns thick.

IMAGE FORMATION

The image is produced by forming a latent image of charge on dielectric layer 12 and toning the latent image. When a multi-colored image is desired, the imaging and toning sequence is repeated with additional toners of different colors, either in sequentially arranged imaging and toning stations or by passing the element under the same imaging station and replacing the toner in the toning station.

Typically, the printer comprises: a stylus or electrostatic imaging bar that produces an electrostatic latent image on dielectric layer 12; a liquid toner developing device that includes an application system to deposit liquid toner on the electrostatic latent image; and a drying system to remove the solvent from the liquid toner. Printers include those available from, for example, Xerox ColorgrafX Systems (San Jose, Calif.), 3M Commercial Graphics (St. Paul, Minn.), and Raster Graphics (San Jose, Calif.).

Color reproduction usually requires at least three color toners, typically yellow, magenta, and cyan, and preferably four different color toners, yellow, magenta, cyan, and black, to render a pleasing and accurate facsimile of an original color image. Typically, the toners are applied in the order:

black, cyan, magenta, and yellow. Additional colors may be added, if desired. The selection of toner colors and the creation of the different images whose combination will provide an accurate rendition of an original image is well known in the art. Toners are available from, for example, Xerox ColorgrafX Systems (San Jose, Calif.), 3M Commercial Graphics (St. Paul, Minn.), Raster Graphics (San Jose, Calif.), and Specialty Toner Corp. (Fairfield, N.J.).

Some printers have a fifth toning station that permits a fifth color to be added to the image. Alternatively, this station may be used to print a clear protective topcoat over the colored image. A clear toner is used to form the clear protective topcoat. The clear protective topcoat may be printed as a continuous layer, which is over both the imaged and the unimaged portions of the dielectric layer, or over just the imaged portions of the dielectric layer. Alternatively, the clear protective topcoat may be printed by replacing one of the toners in the printer with a clear toner and printing the clear toner over the toned image.

If desired, the element may be embossed to produce a embossed wallcovering. Embossing must be carried out after imaging. If the element were embossed prior to imaging, the pattern would interfere with the charging of the element during imaging.

INDUSTRIAL APPLICABILITY

The electrographic elements posses a high degree of durability and can be used to prepare wallcoverings by electrographic imaging. Electrographic imaging can produce small amounts of custom-designed wallcoverings on demand with short turnaround times. Because the image can be stored in digital form, customers would be able to get an exact match in both color and pattern when reordering, even years later.

EXAMPLES

| Glossary | |
|---|---|
| Acrylic resin E-326 | Solvent based modified acrylic copolymer (Rohm & Haas, Philadelphia, PA) |
| Acrysol ® RM-825 | Acrylic non-ionic thickner (Rohm & Haas, Philadelphia, PA) |
| Ageflex ® FA1Q80MC | 80% 2-Acryloyloxyethyltrimethylammonium chloride in water (CPS Chemical, Old Bridge, NJ) |
| Ansilex ® 93 | Calcined clay, 100% solids (Engelhard Industries) |
| Agestat ® 41T | Poly(dimethyldiallyl ammonium chloride) (CPS Chemical, Old Bridge, NJ) |
| Airflex ® 110 | Ethylene/vinyl acetate emulsion (Air Products, Allentown, PA) |
| Butvar ® B-76 | Polyvinyl butyral (weight ave. molecular weight: 90,000–120,000) (Monsanto, St. Louis, MO) |
| β-CEA | Carboxyethyl acrylate (UCB Chemicals Corp., Smyrna, GA) |
| Chemistat ® 6300H | 33% Styrene/methacrylate quaternary ammonium electroconductive copolymer in aqueous solution (Sanyo Chemical Industries, Kyoto, Japan) |
| Darocur ® 1173 | 2-Hydroxy-2-methyl-1-phenylpropan-1-one (Ciba Geigy, Hawthorne, NY) |
| Ebecryl ® 1608 | Bisphenol A epoxy acrylate & 20 percent propoxylated glycerol triacrylate (U.C.B. Radcure Inc., Smyrna, GA) |
| Ebecryl ® 270 | Aliphatic urethane diacrylate (U.C.B. Radcure Inc., Smyrna, GA) |
| Hycar ® 2679 | Acrylic latex, 49.0% solids, Tg = −3° C. (B. F. Goodrich, Cleveland, OH) |

-continued

| Glossary | |
|---|---|
| Hycar ® 26796 | Self-thickening acrylic used as a paper saturant, Tg (DSC) = 4° C. (B. F. Goodrich, Cleveland, OH) |
| Hydrocarb ® PG3 | Wet ground calcium carbonate, average particle size of 3 μm (OMYA, Proctor, VT) |
| Hydrocarb ® PG5 | Wet ground calcium carbonate, average particle size of 5 μm (OMYA, Proctor, VT) |
| Methocel ® E15-LV | Methyl cellulose (Dow, Midland, MI) |
| Neorez ® R-960 | Aqueous polyurethane dispersion (Zeneca Resins, Wilmington, MA) |
| Piccolastic ® A-5 | Low molecular weight polystyrene (Hercules, Wilmington, DE) |
| Ropaque ® HP-91 | Styrenated-acrylic pigmentary polymeric particles (Rohm & Haas, Philadelphia, PA) |
| Solvitose ® HCT-1 | Starch adhesive (Avebe America, Princeton, NJ) |
| Surfynol ® PC | Non-silicone defoamer (Air Products, Allentown, PA) |
| Syloid ® W-500 | Amorphous silica, 45% solids, average particle size 5.4 microns (W. R. Grace) |
| Tamol ® 805 | Sodium polymethacrylate (Rohm & Haas, Philadelphia, PA) |
| Ti-Pure ® R-100 | Aqueous titanium dioxide dispersion (Dupont, Wilmington, DE) |
| Ti-Tint ® White R-70 | Titanium dioxide (Technical Industries) |
| Ultra White ® 90 | Hydrated clay, 100% solids (Engelhard Industries) |
| TMPEOTA | Trimethylolpropane ethoxy acrylate (UCB Chemicals Corp., Smyrna, GA) |
| Uvitex ® OB | Optical brightener (Ciba Geigy, Hawthrone, NY) |
| Vinac ® ASB-516 | Polyvinyl acetate (Air Products, Allentown PA) |
| Witco BB748 | Defoamer (Witco, Perth Amboy, NJ) |
| Witco 3056A | Defoamer (Witco, Perth Amboy, NJ) |
| Zelec ® 1410M | Electroconductive powder (Dupont, Wilmington, DE) |

General Procedures

Electrical conductivity is characterized by surface resistivity, expressed in ohms per square (Ω/□). Unless otherwise indicated, surface resistivity was measured at 100 volts under TAPPI conditions, 73° F. (about 23° C.) and 50% relative humidity, with a Monroe Model 272A resistivity meter (Monroe Electronics, Lyndonville, N.Y.). Image density and image background (delta E) were measured with X-Rite 938 spectrodensitometer (X-Rite, Inc., Grandville, Mich.). Compositions are in parts by weight unless otherwise indicated. Sheffield surface roughness (expressed in mL/min) was measured with a Smoothcheck apparatus (Giddiness & Luis).

Wet shrinkage is measured by the test procedure described in "Federal Specification: Wallcovering, Vinyl Coated" (CCC-W-408D, ¶ 4.4.7, Jan. 14, 1994). Three 10 in×10 in (254 cm×254 cm) samples are each soaked for 30 min in cold water, withdrawn from the water, and dried in a circulating air oven at 200° F. (93.3° C.) for 30 min. The samples are conditioned at TAPPI conditions (50% relative humidity and 72° F. (about 22° C.)) for 8 hr and remeasured. Wet shrinkage is: [(Length before−Length after) Length before]×100.

Example 1

This example illustrates an electrographic recording comprising a filled layer. The element is suitable for use as a wallcovering. Hyflex® 7 paper (Decorative Specialties International, Brownville, N.Y.) is a base 18 comprising filled layer 16. Alternatively, a base comprising a filled layer is prepared by the procedure described below.

Base 18, 9720-006 -/- (Rexam-DSI, 1 Canal Street, South Hadley, Mass. 01705), a paper web used in the manufacture of coated book covers, is a 6 point, freesheet paper web saturated with a Hycar® 26796. Base 18 is coated with coating composition containing: water, about 259.8 parts; Tamol® 850, about 3.8 parts; Witco 3056A, about 1.9 parts; Ti-Tint® White R-70, about 166.3 parts; Ultra White® 90, about 181.9 parts; Ansilex® 93, about 156.0 parts; Syloid® W-500, about 47.5 parts; Ropaque® HP-91, about 93.5 parts; Hycar® 2679, about 387.2 parts; and Witco BB748, about 1.2 parts. The coating composition is prepared by dispersing the pigments in water using a high-speed, high-shear, impeller type dispersing apparatus to achieve a stable, agglomerate free dispersion. Ammonium hydroxide is used to adjust the pH of the dispersion to about 8.4 to 8.5. The coating composition is applied to the surface of the base by a conventional roll coater and metered to the desired coating rate by a conventional air knife type devise. The coating rate is determined by the minimum quantity of coating material required to develop a smooth, uniform layer over the irregular substrate surface and was adjusted to produce a dried coating thickness of about 20 to 25 microns.

The coated base then is transported into a conventional tunnel type drying chamber where the coated surface is raised to a temperature between about 52° C. (about 125° F.) and about 80° C. (about 175° F.) to remove the volatile content of the coating and initiate coalescence and curing of the dispersed polymer particles. The dried element consisting of base 18 and filled layer 16 is cooled to below 52° C. (125° F.) and wound into a roll. Wet shrinkage was 0.4% in the machine direction and 0.8% in the cross-machine direction.

A frontside conductive coating composition was prepared from the following ingredients.

| Ingredient | Parts by Weight |
|---|---|
| Ethanol | 51.2 |
| Water | 17.1 |
| Chemistat ® 6300H | 29.8 |
| Ammonium hydroxide | 0.12 |
| Vinac ® ASB-516 | 1.8 |

The ingredients were added to a tank and mixed with a Lightnin® Mixer until the Vinac® ASB-516 polyvinyl acetate beads dissolved (about 2 hr). The pH of the resulting coating composition was adjusted to 9.5 with ammonium hydroxide.

The frontside conductive coating composition was rod coated onto the filled layer of the base/filled layer element at a wet coating weight of about 4.2 lbs/tsf (about 20.5 g/m$^2$) and dried to form an element consisting of base 18, filled layer 16, and frontside conductive layer 14. The conductive layer had a surface electrical resistivity of 7.0×10$^6$ Ω/□.

The backside conductive coating composition was prepared from the following ingredients.

| Ingredient | Parts by Weight |
|---|---|
| Ethanol | 30.2 |
| Water | 10.1 |
| Chemistat ® 6300H | 59.7 |

The ingredients were added to a tank and mixed with a Lightnin® Mixer for about 10 minutes. The backside coating composition was rod coated onto the backside (base side) of the previously formed element consisting of base 18, filled layer 16, and frontside conductive layer 14 at a wet coating weight of about 2.5 lbs/tsf (about 12.2 g/m$^2$) and dried to form an element consisting of backside conductive layer 20, base 18, filled layer 16, and frontside conductive layer 14. The resulting backside conductive layer had a surface electrical resistivity of 4.0×10$^6$ Ω/□.

The dielectric coating composition was prepared from the following ingredients.

| Ingredient | Parts by Weight |
|---|---|
| Ethanol | 5.8 |
| Acetone | 26.4 |
| Toluene | 38.1 |
| Butvar ® B-76 | 5.5 |
| Acrylic resin E-326 | 11.0 |
| Piccolastic ® A-5 | 2.2 |
| Hydrocarb ® PG3 | 7.7 |
| Hydrocarb ® PG5 | 2.5 |
| Ti-Pure ® R-100 | 0.8 |
| Uvitex ® OB | 0.09 |

The dielectric coating mixture was applied to frontside conductive layer 14 of the element formed in the preceding step by reverse roll coating and dried to form electrographic imaging element 10 consisting of dielectric layer 12, frontside conductive layer 14, filled layer 16, base 18, and backside conductive layer 20. The dry coating weight of the dielectric layer was 1.2 lb/tsf (5.8 g/m$^2$). The coated paper was moisturized to a level of 5.5% to 6.5% by weight by conventional procedures (i.e., by a humidifier station on the coater).

A four-color toned image was formed on dielectric layer 12 of element 10 using a Versatec® 8954 four color electrostatic printer (Xerox Engineering Systems, San Jose, Calif.) using standard toners and plotter settings.

The imaged element was evaluated as described in "Standard Classification of Wallcovering by Durability Characteristics," ASTM Test Method F-793-93 (American Society for Testing and Materials, Philadelphia, Pa., 1993), incorporated herein by reference. Wet shrinkage in the machine direction was 0.8%. Wet shrinkage in the cross machine direction was 0.4%. Breaking strength in the machine direction was 35 lb. Breaking strength in the cross machine direction was 25 lb. The tear resistance was 110 lb. Flame spread was 2.5. Smoke development was 0.9. Scrubbability was 500 cycles. Washability was 100 cycles. Blocking resistance was 1. In the stain resistance test, the imaged element showed no evidence of appreciable change to the decorative surface when treated with reagents 1 to 10 as specified in the test.

Example 2

This example illustrates formation of an electrographic recording element suitable for use as a wallcovering comprising a filled layer and a radiation cured frontside conductive layer.

An ultra-violet curable conductive coating composition was prepared from the following ingredients.

| Ingredient | Parts by Weight |
|---|---|
| Ageflex ® FA1Q80MC | 44 |
| β-CEA | 20 |
| TMPEOTA | 10 |
| Ebecryl ® 1608 | 22 |
| Darocur ® 1173 | 4 |

Ageflex® FA1Q80MC quaternary ammonium salt was added to a the mix tank first, followed by the rest of the ingredients in the order shown. The mixture was mixed with a Lightnin® Mixer for about 1 hr at slow speed to minimize air entrainment.

The frontside conductive coating composition was coated onto filled layer 16 of the element consisting of base 18 and filled layer 16 described in Example 1 and dried. The composition was coated by direct reverse gravure coating at a wet coating weight of about 0.7 to 1.3 lbs/tsf (about 3.4 to 6.4 g/m$^2$). The coated base was cured by exposure to a 300 to 600 watts/in (about 120 to 240 watts/cm) ultra-violet source in the presence of an inerting gas to produce an intermediate element consisting of base 18, filled layer 16, and radiation cured frontside conductive layer 14.

The surface roughness of base 18 with filled layer 16 was 20–30 mL/min. The surface roughness of cured frontside conductive layer 14 was 10–15 mL/min.

A backside conductive coating was applied to the base side of the element as described in Example 1. A dielectric coating was applied to the cured conductive coating as described in Example 1 to form electrographic imaging element 10 consisting of dielectric layer 12, radiation cured frontside conductive layer 14, filled layer 16, base 18, and backside conductive layer 20.

The element was imaged and evaluated as described in Example 1. wet shrinkage in the machine direction was 0.8%. Wet shrinkage in the cross machine direction was 0.4%. The breaking strength in the machine direction was 35 lb. The breaking strength in the cross machine direction was 25 lb. The tear resistance was 110 lb. Blocking resistance was 1. Scrubbability was 200 cycles. In the stain resistance test, the imaged element showed no evidence of appreciable change to the decorative surface when treated with reagents 1 to 10.

Example 3

This example describes preparation of an element in which backside conductive layer 20 comprises is adhesive, which gives the element the properties of a pre-pasted wallcovering.

An element comprising base 18, filled layer 16, and frontside conductive layer 14 was prepared as described in Example 1. The conductive adhesive coating composition was prepared from the following ingredients.

| Ingredient | Parts by Weight |
|---|---|
| Water | 48 |
| Solvitose ® HCT-1 | 2 |
| Chemistat ® 6300H | 50 |

Solvitose® HCT-1 starch was added to the water and the mixture mixed with a Lightnin® Mixer until the starch dissolved (about 15 min). Chemistat® 6300H conductive copolymer was added and the mixture mixed for an additional 10 min.

The conductive adhesive coating composition was applied to the backside (base side) of the element by rod coating at a wet coating weight of about 5.3 lb/tsf (about 25.9 g/m$^2$) and dried to a dry coating weight of about 1.0 to 1.5 lb/tsf (about 4.9 to 7.3 g/m$^2$). The resistivity of adhesive backside conductive layer 20 was about 3–8x10$^6$ Ω/□.

Dielectric coating 12 was applied to frontside conductive 14 coating as described in Example 1 to form electrographic imaging element 10 consisting of dielectric layer 12, frontside conductive layer 14, filled layer 16, base 18, and adhesive backside conductive layer 20.

The resulting element was imaged and evaluated as described in Example 1. The breaking strength in the machine direction was 35 lb. The breaking strength in the cross machine direction was 25 lb. The tear resistance was 110 lb. Scrubbability was 500 cycles. In the stain resistance test, the imaged element showed no evidence of appreciable change to the decorative surface when treated with reagents 1 to 10.

Adhesive backside conductive layer 18 was submerged in water for 5 sec and allowed to stand for 10 min. The element was then affixed to a standard drywall. After 24 hr, the adhesion of the element to the drywall was excellent.

Example 4

This example describes preparation of an element in which backside conductive layer 20 comprises is adhesive, which gives the element the properties of a pre-pasted wallcovering.

A conductive adhesive coating composition was prepared from the following ingredients.

| Ingredient | Parts by Weight |
|---|---|
| Water | 68.6 |
| Ethanol | 12.4 |
| Methocel ® E15-LV | 2.3 |
| Agestat ® 41T | 16.7 |

The ethanol and about one third of the water were added to a mix tank equipped with a high speed dispersion mixer. The Methocel® E15-LV methyl cellulose was added with high speed mixing over a 20 min period. After an additional 20 min, the stirring rate was decreased. The Agestat® 41T conductive polymer and the rest of the water were added. Stirring was continued for about 10 min to form the conductive adhesive coating composition.

The coating composition was applied to the backside (base side) of the element by rod coating at a wet coating weight of about 8–11 lb/tsf (about 38–53 g/m$^2$) and dried to a dry coating weight of about 1.0–1.5 lb/tsf (about 4.8–7.2 g/m$^2$). The resistivity of backside layer was about 5–8x10$^6$ Ω/□.

Dielectric coating 12 was applied to frontside conductive 14 coating as described in Example 1 to form electrographic imaging element 10 consisting of dielectric layer 12, frontside conductive layer 14, filled layer 16, base 18, and backside conductive adhesive layer 20.

The element was imaged and evaluated as described in Example 1. Wet shrinkage in the machine direction was 0.8%. Wet shrinkage in the cross machine direction was 0.4%. Breaking strength in the machine direction was 35 lb. Breaking strength in the cross machine direction was 25 lb. The tear resistance was 110 lb. Flame spread was 2.5. Smoke development was 0.9. Scrubbability was 500 cycles. Washability was 100 cycles. Blocking resistance was 1. In the stain resistance test, the imaged element showed no evidence of appreciable change to the decorative surface when treated with reagents 1 to 10 as specified in the test.

Example 5

This example illustrates formation of an electrographic recording element suitable for use as a wallcovering in which the frontside conductive coating comprises a conductive particulate material. A conductive coating composition was prepared from the following ingredients.

| Ingredient | Parts by Weight |
|---|---|
| Water | 17 |
| Ethanol | 17 |
| Zelec ® 1410M | 12.4 |
| Surfynol ® PC | 0.1 |
| Neorez ® R-960 | 53.6 |
| Acrysol ® RM-825 | 1.3 |

The water and ethanol were added to a mix tank equipped with a high speed dispersion mixer. Zelec® 1410M conductive powder was slowly sifted in and the mix stirred at 2000 rpm for 0.5 hr. Surfynol® PC defoamer and Neorez® R-960 polyurethane dispersion were added and the mix speed reduced to 800–1000 rpm. Acrysol® RM-825 was added and the mix stirred for 0.25 hr. The mixture was applied to the frontside of the element consisting of base 18 and filled layer 16 described in Example 1 by rod coating at a coating weight of about 1.0 lb/tsf (about 4.9 g/m$^2$).

The backside conductive coating and dielectric layer were applied as described in Example 1 to form electrographic imaging element 10 consisting of dielectric layer 12, frontside conductive layer 14, filled layer 16, base 18, and backside conductive layer 20. The element imaged in a printer and has a higher degree of waterfastness than the other elements. However, it is slightly gray in color due to the background produced by the conductive powder. The other properties were the same as those of the element produced in Example 1.

Example 6

This example illustrates formation of an electrographic recording element suitable for use as a wallcovering in which the frontside conductive coating comprises a polymeric quaternary ammonium compound. The frontside conductive coating composition was prepared from the following.

| Ingredient | Parts by Weight |
|---|---|
| Water | 46.1 |
| Chemistat ® 6300H | 44.8 |
| Airflex ® 110 | 9.1 |

The water and Chemistat® 6300H electroconductive copolymer were added to a tank and mixed with a Lightnin® Mixer for about 5 min. The Airflex® 110 copolymer emulsion was added and the mixture stirred for about 15 min to produce the frontside conductive coating composition.

The frontside conductive coating composition was rod coated onto the frontside of the element consisting of base 18 and filled layer 16 described in Example 1 at a dry coat weight of about 0.5 lb/tsf (about 2.4 g/m$^2$) and dried. The backside conductive layer and dielectric layer were applied as described in Example 1 to form electrographic imaging element 10 consisting of dielectric layer 12, frontside conductive layer 14, filled layer 16, base 18, and backside conductive layer 20.

The element was imaged and evaluated as described in Example 1. The image density met the minimum requirements: black, about 1.00; cyan, about 0.85; magenta, about 0.85; and yellow, about 0.75. This image has a high degree of waterfastness. Wet shrinkage in the machine direction was 0.8%. Wet shrinkage in the cross machine direction was 0.4%. The breaking strength in the machine direction was 35 lb. The breaking strength in the cross machine direction was 25 lb. The tear resistance was 110 lb. Blocking resistance was 1. Scrubbability was 500 cycles. In the stain resistance test, the imaged element showed no evidence of appreciable change to the decorative surface when treated with reagents 1 to 10.

Example 7

This example illustrates formation of an electrographic recording element suitable for use as a wallcovering comprising a radiation cured frontside conductive layer.

A 78 lb/ream base paper (Wallpaper Roll Print "SR", E.B. Eddy Forest Products LTD, Ottawa, Canada) was coated with the following frontside radiation-curable conductive composition. The base paper has a surface roughness of about 40–45 mL/min.

| Ingredient | Parts by Weight |
|---|---|
| Ageflex ® FA1Q80MC | 50 |
| β-CEA | 16 |
| TMPEOTA | 5 |
| Ebecryl ® 1608 | 15 |
| Ebecryl ® 270 | 10 |
| Darocur ® 1173 | 4 |

The Ageflex® FA1Q80MC was added to the mix tank followed by the other ingredients in the order shown. The mixture was mixed with a Lightnin® mixer for 1 hr at slow speed to minimize air entrainment. The coating was applied to the front side of the base by direct reverse gravure at a wet coating weight of 0.7 to 1.3 lb/tsf (about 3.4 to 6.4 g/m$^2$). The coating was dried and cured by exposure to ultra-violet radiation as described in Example 2. The cured coating had a surface roughness of about 10–15 mL/min.

The backside conductive coating and dielectric layer were applied as described in Example 1 to form electrographic imaging element 10 consisting of dielectric layer 12, radiation cured frontside conductive layer 14, base 18, and backside conductive layer 20.

The element was imaged and evaluated as described in Example 1. Image densities obtained from two different coatings were: black, 1.30 to 1.45; cyan, 1.15 to 1.35; magenta, 1.10 to 1.15; yellow, 0.85 to 0.90; and delta E (background) 0.7 to 1.3. These compares with the minimum requirements of: black, about 1.00; cyan, about 0.85; magenta, about 0.85; and yellow, about 0.75. The wet shrinkage was about 0.4% in the machine direction and about 0% in the cross machine direction. The breaking strength in the machine direction was 40 lb. The breaking strength in the cross machine direction was 35 lb. The tear resistance was 90 lb. Flame spread was 15. Smoke development was 5. Scrubbability was 300 cycles. Washability was 100 cycles. In the stain resistance test, the imaged element showed no evidence of appreciable change to the decorative surface when treated with reagents 1 to 10 as specified in the test.

Example 8

This example illustrates formation of an electrographic recording element suitable for use as a wallcovering comprising a radiation cured frontside conductive layer in which backside conductive layer 20 comprises a conductive adhesive, which gives the element the properties of a prepasted wallcovering.

A 78 lb/ream base paper (Wallpaper Roll Print "SR", E.B. Eddy Forest Products LTD, Ottawa, Canada) was coated with frontside radiation-curable as described in Example 7.

An adhesive backside conductive coating was applied as described in Example 3. Then a dielectric coating was applied to the radiation cured conductive layer as described in Example 1 to form electrographic imaging element 10 consisting of dielectric layer 12, radiation cured frontside conductive layer 14, base 18, and adhesive backside conductive layer 20.

Having described the invention, we now claim the following and their equivalents.

What is claimed is:

1. An electrographic recording element suitable for forming a wallcovering, the element comprising, in order:

(a) a backside conductive layer;

(b) a base;

(c) a filled layer;

(d) a frontside conductive layer; and (e) a dielectric layer;

wherein:

the frontside conductive layer comprises, in polymerized form, 10 to 90 parts by weight of the one or more ethylenically unsaturated ammonium precursors and 10 to 90 parts by weight of the other polymerizable precursors, the parts by weight based on the total weight of the one or more ethylenically unsaturated ammonium precursors and the other polymerizable precursors present in the frontside conductive layer;

the one or more ethylenically unsaturated ammonium precursors and the other polymerizable precursors together comprise at least 50 percent by weight of the total solids present in the frontside conductive layer;

the surface resistivity of the frontside conductive layer is about $1\times10^5$ Ω/□ to about $1\times10^8$ Ω/□;

the surface resistivity of the backside conductive layer is about $1\times10^5$ Ω/□ to about $1\times10^8$ Ω/□;

the filled layer comprises a binder or binders and a pigment or pigments, the ratio of total binder to total pigment being about 2.1 to 3.1; and the element has a wet shrinkage of less than about 2% in the machine direction and less than about 2% in the cross-machine direction.

2. The element of claim 1 in which the element has a wet shrinkage of less than about 2% in the machine direction and less than about 1% in the cross-machine direction.

3. The element of claim 2 in which frontside conductive layer comprises 50 to 90 of the one or more ethylenically unsaturated ammonium precursors, based on the total weight of the ethylenically unsaturated ammonium precursors and the other polymerizable precursors present in the frontside conductive layer.

4. The element of claim 3 in which the surface resistivity of the frontside conductive layer is about $1\times10^6$ Ω/□ to about $1\times10^7$ Ω/□, and the surface resistivity of the backside conductive layer is about $1\times10^6$ Ω/□ to about $1\times10^7$ Ω/□.

5. The element of claim 4 in which frontside conductive layer comprises 70 to 90 of the one or more ethylenically unsaturated ammonium precursors, based on the total weight of the ethylenically unsaturated ammonium precursors and the other polymerizable precursors present in the frontside conductive layer.

6. The element of claim 5 in which the surface roughness of the frontside conductive layer is less than the surface roughness of the base.

7. The element of claim 5 in which the frontside conductive layer additionally comprises a photoinitiator system and in which the ethylenically unsaturated ammonium precursors and the other polymerizable precursors together comprise at least 80 percent by weight of the total solids in the frontside conductive layer.

8. The element of claim 7 in which the surface roughness of the frontside conductive layer is less than the surface roughness of the base.

9. The element of claim 2 in which the backside conductive layer is adhesive.

10. The element of claim 9 in which the backside conductive layer comprises a conductive quaternary resin and an adhesive that is compatible with the conductive quaternary resin, and in which the backside conductive layer comprises more conductive quaternary resin than adhesive, based on the weight of the solids present in the conductive adhesive layer.

11. The element of claim 3 in which the surface resistivity of the frontside conductive layer is about $1\times10^6$ Ω/□ to about $1\times10^7$ Ω/□, and the surface resistivity of the backside conductive layer is about $1\times10^6$ Ω/□ to about $1\times10^7$ Ω/□.

12. The element of claim 2 in which the frontside conductive layer additionally comprises a polymerizable, conductivity exalting comonomer, said comonomer selected from the group consisting of interpolymerizable acids with an acid number between 100 and 900, hydroxyalkyl esters of acrylic or methacrylic acid, cyanoalkyl esters of acrylic or methacrylic acid, and combinations thereof.

13. The element of claim 12 in which the one or more ethylenically unsaturated ammonium precursors and the polymerizable, conductivity exalting comonomer comprise 45 to 90 parts by weight of the total weight of the one or more ethylenically unsaturated ammonium precursors and the other polymerizable precursors present in the frontside conductive layer and in which the polymerizable, conductivity exalting comonomer is between about 20 parts by weight to 67 parts by weight of the total of the comonomer and the one or more ethylenically unsaturated ammonium precursors, and the one or more ethylenically unsaturated ammonium precursors are between 33 parts by weight and 80 parts by weight of the total of the comonomer and the one or more ethylenically unsaturated ammonium precursors.

14. The element of claim 13 in which multifunctional polymerizable precursors comprise greater than 55 parts by weight of the other polymerizable precursors present in the frontside conductive layer, exclusive of the conductivity exalting comonomer.

15. The element of claim 14 in which the one or more ethylenically unsaturated ammonium precursors and the polymerizable, conductivity exalting comonomer comprise 25 to 60 parts by weight of the total weight of the one or more ethylenically unsaturated ammonium precursors and the other polymerizable precursors present in the frontside conductive layer and in which the polymerizable, conductivity exalting comonomer is between about 40 parts by weight to 75 parts by weight of the total of the comonomer and the one or more ethylenically unsaturated ammonium precursors, and the one or more ethylenically unsaturated ammonium precursors are between 33 parts by weight and 80 parts by weight of the total of the comonomer and the one or more ethylenically unsaturated ammonium precursors.

16. The element of claim 15 in which multifunctional polymerizable precursors comprise greater than 85 parts by weight of the other polymerizable precursors present in the frontside conductive layer, exclusive of the conductivity exalting comonomer.

17. The element of claim 16 in which the surface roughness of the frontside conductive layer is less than the surface roughness of the base.

18. The element of claim 12 in which the backside conductive layer is adhesive.

19. The element of claim 18 in which the backside conductive layer comprises a conductive quaternary resin and an adhesive that is compatible with the conductive quaternary resin, and in which the backside conductive layer comprises more conductive quaternary resin than adhesive, based on the weight of the solids present in the conductive adhesive layer.

20. The element of claim 1 in which the element has a wet shrinkage of about 1% or less in the machine direction and about 0.5% or less in the cross-machine direction.

21. An electrographic recording element suitable for use as a wallcovering, the element comprising, in order:

(a) a backside conductive layer;

(b) a substrate;

(c) a filled layer;

(d) a frontside conductive layer; and (e) a dielectric layer;

wherein:

the filled layer comprises a binder or binders and a pigment or pigments;

the ratio of total binder to total pigment is about 2.1 to 3.1; and the pigment or pigments and binder or binders together comprises at least 90% by weight of the filled layer;

the surface resistivity of the frontside conductive layer is about $1\times10^5$ to about $1\times10^8$ Ω/□;

the surface resistivity of the adhesive backside conductive layer is about $1\times10^5$ to about $1\times10^8$ Ω/□; and the element has a wet shrinkage of less than about 2% in the machine direction and less than about 2% in the cross-machine direction.

22. The element of claim 21 in which the element has a wet shrinkage of less than about 2% in the machine direction and less than about 1% in the cross-machine direction.

23. The element of claim 22 in which the surface resistivity of the frontside conductive layer is about $1\times10^6$ Ω/□ to about $1\times10^7$ Ω/□, and the surface resistivity of the backside conductive layer is about $1\times10^6$ Ω/□ to about $1\times10^7$ Ω/□.

24. The element of claim 23 in which the ratio of total binder to total pigment is about 2.4 to 2.8.

25. An imaged electrographic element suitable for use as a wallcovering, the element comprising, in order:

(a) a backside conductive layer;

(b) a substrate;

(c) a filled layer;

(d) a frontside conductive layer;

(e) a dielectric layer; and (f) a toned image;

wherein:

the filled layer comprises a binder or binders and a pigment or pigments;

the ratio of total binder to total pigment is about 2.1 to 3.1; and the pigment or pigments and binder or binders together comprises at least 90% by weight of the filled layer;

the surface resistivity of the frontside conductive layer is about $1\times10^5$ to about $1\times10^8$ Ω/□;

the surface resistivity of the adhesive backside conductive layer is about $1\times10^5$ to about $1\times10^8$ Ω/□; and the element has a wet shrinkage of less than about 2% in the machine direction and less than about 1% in the cross-machine direction.

26. The element of claim 25 additionally comprising a clear protective topcoat over the toned image.

27. The element of claim 9 in which the backside conductive layer comprises an adhesive selected from the group consisting of starch, polyvinyl acetates, polyvinyl alcohols, methyl cellulose, polyacryl amides, and polyacrylates.

28. The element of claim 18 in which the backside conductive layer comprises an adhesive selected from the group consisting of starch, polyvinyl acetates, polyvinyl alcohols, methyl cellulose, polyacryl amides, and polyacrylates.

29. The element of claim 23 in which the backside conductive layer is adhesive.

30. The element of claim 23 in which the backside conductive layer comprises a conductive quaternary resin and an adhesive that is compatible with the conductive quaternary resin, and in which the backside conductive layer comprises more conductive quaternary resin than adhesive, based on the weight of the solids present in the conductive adhesive layer.

31. The element of claim 29 in which the backside conductive layer comprises an adhesive selected from the group consisting of starch, polyvinyl acetates, polyvinyl alcohols, methyl cellulose, polyacryl amides, and polyacrylates.

32. The element of claim 21 in which the element has a wet shrinkage of about 1% or less in the machine direction and about 0.5% or less in the cross-machine direction.

33. The element of claim 25 in which the element has a wet shrinkage of less than about 2% in the machine direction and less than about 1% in the cross-machine direction.

34. The element of claim 33 in which the backside conductive layer is adhesive.

35. The element of claim 33 in which the backside conductive layer comprises a conductive quaternary resin and an adhesive that is compatible with the conductive quaternary resin, and in which the backside conductive layer comprises more conductive quaternary resin than adhesive, based on the weight of the solids present in the conductive adhesive layer.

36. The element of claim 35 in which the backside conductive layer comprises an adhesive selected from the group consisting of starch, polyvinyl acetates, polyvinyl alcohols, methyl cellulose, polyacryl amides, and polyacrylates.

37. The element of claim 25 in which the toned image comprises at least three different colored toners.

* * * * *